(12) United States Patent
Seshadri et al.

(10) Patent No.: US 11,210,110 B2
(45) Date of Patent: Dec. 28, 2021

(54) APPLICATION LIBRARY ANALYTICS TOOL

(71) Applicant: JPMorgan Chase Bank, N.A., New York, NY (US)

(72) Inventors: Dilip Seshadri, Bangalore (IN); Nagesh Narsing Bhosle, Bangalore (IN); Vipulkumar Bharatlal Tailor, Bangalore (IN)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 16/871,430

(22) Filed: May 11, 2020

(65) Prior Publication Data
US 2021/0349738 A1    Nov. 11, 2021

(51) Int. Cl.
*G06F 9/445* (2018.01)
*G06F 9/455* (2018.01)
*G06F 21/53* (2013.01)
*G06F 8/54* (2018.01)
*G06F 21/56* (2013.01)

(52) U.S. Cl.
CPC ............ *G06F 9/44521* (2013.01); *G06F 8/54* (2013.01); *G06F 9/45504* (2013.01); *G06F 9/45558* (2013.01); *G06F 21/53* (2013.01); *G06F 21/566* (2013.01)

(58) Field of Classification Search
None
See application file for complete search history.

(56) References Cited

U.S. PATENT DOCUMENTS

| 7,735,078 | B1* | 6/2010 | Vaidya | G06F 9/44547 717/171 |
|---|---|---|---|---|
| 2004/0128660 | A1* | 7/2004 | Nair | G06F 8/433 717/156 |
| 2006/0230389 | A1* | 10/2006 | Moulckers | G06Q 10/06 717/127 |
| 2009/0307684 | A1* | 12/2009 | Best | G06F 8/60 717/174 |
| 2010/0138826 | A1* | 6/2010 | Heidel | G06F 8/61 717/175 |
| 2015/0089494 | A1* | 3/2015 | Beak | G06F 9/45558 718/1 |
| 2016/0147547 | A1* | 5/2016 | Elias | G06F 9/44536 717/166 |
| 2018/0025160 | A1* | 1/2018 | Hwang | G06F 8/71 726/25 |

(Continued)

OTHER PUBLICATIONS

D'mello et al., "Distributed Software Dependency Management using Blockchain," IEEE, 2019, 8pg. (Year: 2019).*

(Continued)

*Primary Examiner* — Ryan D. Coyer
(74) *Attorney, Agent, or Firm* — Hunton Andrews Kurth LLP

(57) ABSTRACT

Embodiments disclosed herein provide for systems and methods of identifying package files in an application. The systems and methods include a static scan, a library-dependent archive scan, and a dynamic scan, where, at the conclusion of the scans, a list including each of the unused and/or potentially conflicting libraries in an application may be provided to a user.

18 Claims, 4 Drawing Sheets

(56) References Cited

U.S. PATENT DOCUMENTS

2018/0129812 A1* 5/2018 Kang .................... G06F 21/577
2018/0260433 A1* 9/2018 Ichihashi ................. G06F 8/30

OTHER PUBLICATIONS

Ishio et al., "Software Ingredients: Detection of Third-party Component Reuse in Java Software Release," ACM, 2016, 12pg. (Year: 2016).*
Tucker et al., "OPIUM: Optimal Package Install/Uninstall Manager," IEEE, 2007, 10pg. (Year: 2007).*
Wittern et al., "A Look at the Dynamics of the JavaScript Package Ecosystem," ACM, 2016, 11pg. (Year: 2016).*

* cited by examiner

APPLICATION LIBRARY ANALYTICS TOOL

FIELD OF THE INVENTION

The present invention relates generally to a system and method for identifying package files in an application.

BACKGROUND OF THE INVENTION

Migrating a legacy application from one server to another may lead to a number of problems, e.g., need to upgrade a package file (e.g., Java Archive or JAR file) to a latest version, conflicts between package files, etc. In particular, over a period of time, functionality may get added or removed from an application, which results in the addition of new package files or the removal of references to existing archive classes/functions in the package files. Further, in a lot of these cases, the application ends up inheriting a fairly large library list of relevant package files along with a fair amount of unused package files. In addition, the application might also end up having different libraries with the same package hierarchy/class structure leaving the application with a potential package file conflicts (depending on the class loader used).

Accordingly, there is a need for systems and methods which can overcome at least some of the deficiencies described herein above.

SUMMARY OF THE INVENTION

One aspect of the present disclosure relates to an application library analytics tool. According to an embodiment, the application library analytics tool can identify a list of unused libraries in an application in a variety of different contexts. The application library analytics tool can include a static scan, a library-dependent archive scan, and a dynamic scan, where, at the conclusion of the scans, a list including each of the unused and/or potentially conflicting libraries in an application may be provided to a user. As such, by determining the list of unused or potentially conflicting libraries, the application library analytics tool can facilitate the removal of the particular libraries, thereby resulting in an improvement in the application's space usage and performance.

According to an embodiment, a computer-implemented method for identifying package files in an application can include: performing, with a processor, a first scan of application code, wherein the first scan (i) identifies a list of potential package file library conflicts and (ii) generates a first list of unused package files; performing, with the processor, a second scan on the first list, wherein, during the second scan, (i) relevant package files are identified in the first list and (ii) a second list of unused package files is generated based on a removal of the relevant package files from the first list; performing, with the processor, a third scan on the second list, wherein, during the third scan, (i) any references to any of the package files are identified in the second list while the application is running and (ii) a third list of unused package files is generated based on a removal of any of the package files with references from the second list; and displaying, with a display, (i) the list of potential package file library conflicts and (ii) the third list.

According to an embodiment, a system for identifying package files in an application can include: (a) a processor, wherein the processor is configured to: perform a first scan of application code, wherein the first scan (i) identifies a list of potential package file library conflicts and (ii) generates a first list of unused package files; perform a second scan on the first list, wherein during the second scan, (i) relevant package files are identified in the first list and (ii) a second list of unused package files is generated based on a removal of the relevant package files from the first list; and perform a third scan on the second list, wherein during the third scan, (i) any references to any of the package files in the second list are identified while the application is running and (ii) a third list of unused package files is generated based on a removal of any of the package files with references from the second list; and; and (b) a display, wherein the display displays (i) the list of potential package file library conflicts and (ii) the third list.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE INVENTION

Exemplary embodiments of the invention will now be described in order to illustrate various features of the invention. The embodiments described herein are not intended to be limiting as to the scope of the invention, but rather are intended to provide examples of the components, use, and operation of the invention.

Figure 1A:
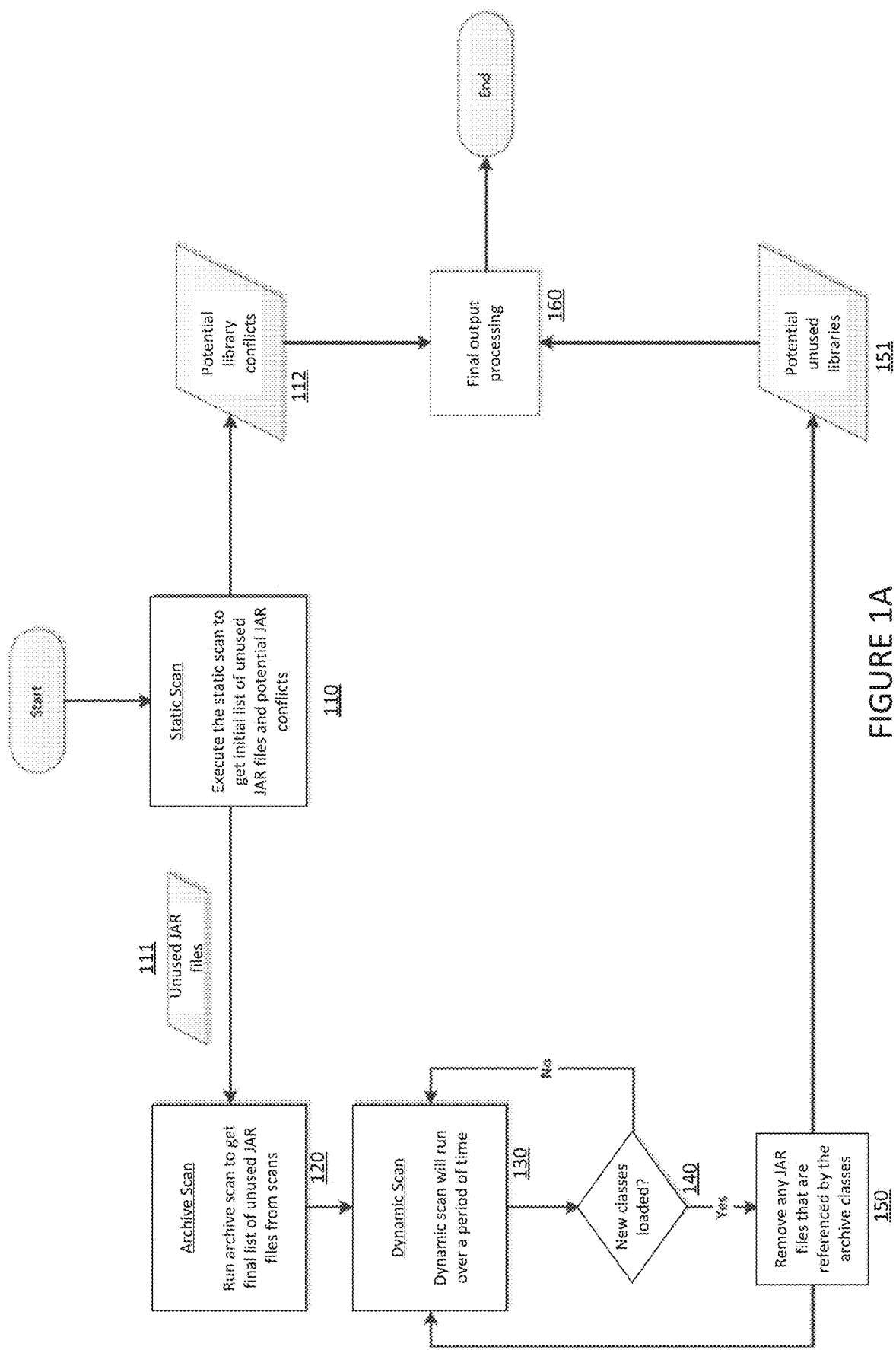
FIG. 1A illustrates a process flow for the application library analytics tool according to an exemplary embodiment of the present invention.
Figure 1B:
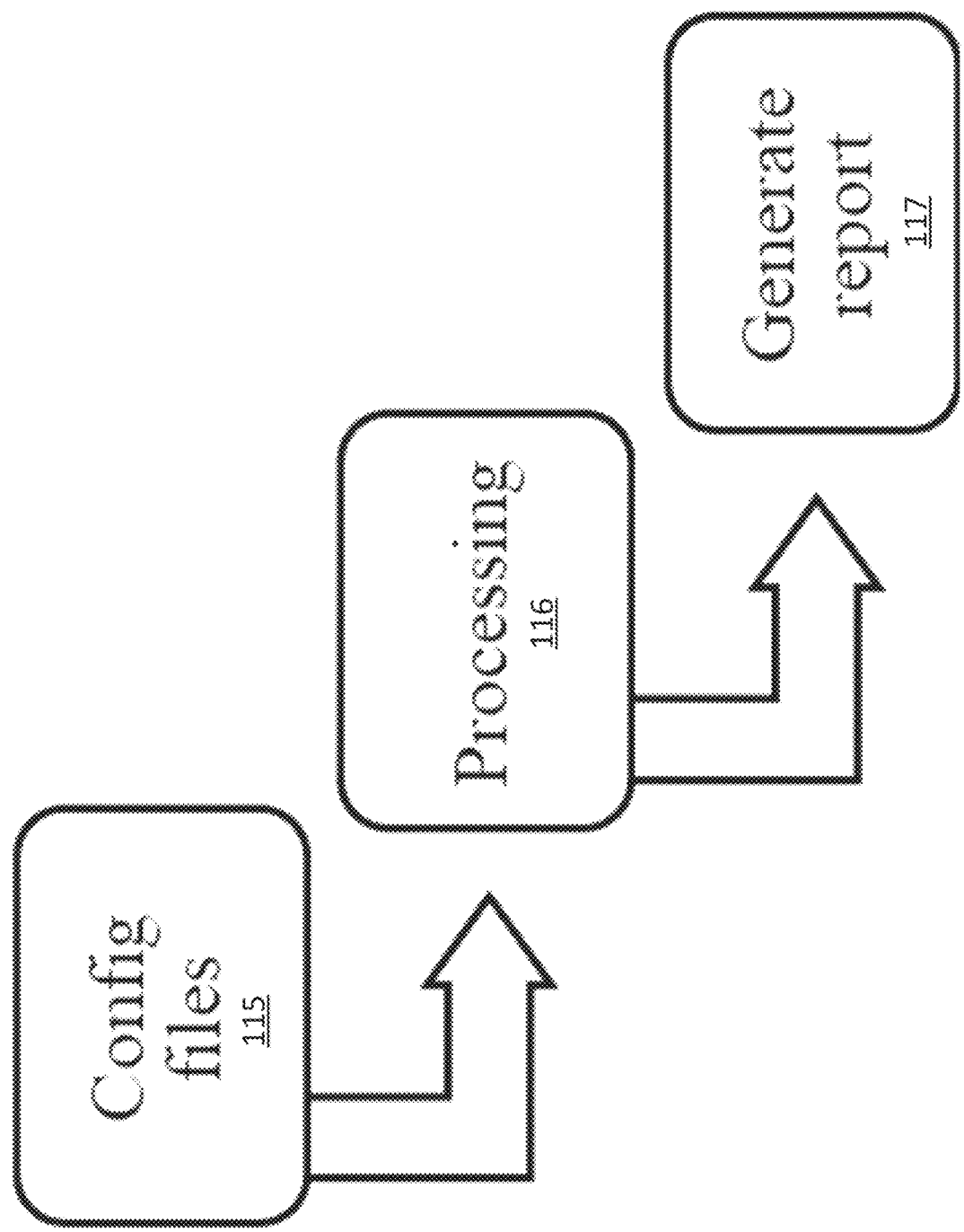
FIG. 1B illustrates the static scan configuration according to an example embodiment of the present invention.

FIG. 1A illustrates a process flow for the application library analytics tool according to an exemplary embodiment of the present invention. As depicted in the figure, in step 110, a first scan, e.g., a static scan, is implemented. The static scan configuration can include a source code path, an archive location (e.g., archive linked with source code, and available on different locations), and an output path (e.g., for generating reports). FIG. 1B illustrates the static scan configuration according to an example embodiment of the present invention. As depicted in the figure, the static scan configuration includes configuration files 115, a processing step 116, and report generating step 117. According to an embodiment, the static scan configuration can include three configurations, each configuration associated with a distinct parameter. Further, according to an embodiment, static scanning can be performed directly on the actual source code itself or on a particular archive file, in which source code and archive files can be retrieved from a given archive file (e.g., JAR or web archive file) and then scanned. With direct scanning of the source code, the program arguments can be SOURCE, <<source path>>, <<library path>>, and <<output path>>. With the scanning of the archive file, the program arguments can be ARCHIVE, <<archive path>>, and <<output path>>. As such, the two methodologies can be distinguished based on the respective first arguments, e.g., SOURCE/ARCHIVE. According to an embodiment, the configuration file 115 can include the source path, the JAR locations, and the output path. During the processing step 116, the source code provided in the configuration file 115 is parsed in order to gather class imports and to identify used Java classes based on the source code path (which is also provided in the configuration file 115). Further, the JAR files from the JAR locations are also parsed in order to identify any JAR conflicts as well as determine the usefulness of JARs. According to an embodiment, during the report generating step 117, a report is generated and placed in the output path (which is also provided in the configuration file 115). According to an embodiment, the report provides results of the class/JAR conflicts as well as usefulness of the JARs. Further, as depicted in FIG. 1A, the first scan can include two portions. During a first portion of the scan, all of the class imports in the application code are scanned and saved in a file system. The solution implementation has different scan components responsible for identifying the unutilized classes. For example, the solution can include: (i) traversing an archive, (ii) traversing source files and folders, (iii) a report generator, (iv) a conflict finder, (v) an unused JAR file finder, and (vi) a run-time JAR file collector and filter with existing static/archive scan results. According to an embodiment, by traversing (and scanning) an archive, useful information within the archive files may be retrieved such as classes, JARs, META-INF, WEB-INF (in case of web archives), etc. Further, by traversing source files and folders, inter-dependent Java source code may retrieved and collected. Further, the report generator can gather relevant information and generate a report including a list of class conflicts as well as unused JAR files. The conflict finder is configured to determine class conflicts based on the results of the static and archive scans. The unused JAR files finder is configured to find unused JAR files based on the results of the static, archive, and depending on whether a dynamic scan is implemented, dynamic scanning. Lastly, the a run-time JAR file collector and filter with existing static/archive scan results is part of the dynamic scan and is configured to identify run-time JAR files and apply appropriate filters on the static and archive scan results. In addition, all of the package files (e.g., JAR files) loaded by the virtual machine (e.g., Java virtual machine) for the application are identified, e.g., ala-0.0.1-SNAPSHOT.jar, ala-0.0.2-SNAPSHOT.jar, commons-io-2.2.jar, gson-2.8.0.jar, guava-20.0.jar, javassist-3.21.0-GA.jar, javax.servlet-api-3.0.1.jar, reflections-0.9.11.jar, spring-core-5.0.7 RELEASE.jar, and spring-jcl-5.0.7. RELEASE.jar. Then, based on the collected metadata, e.g., class import and package file information, a list of potential library conflicts can be determined. The library conflicts are identified based on the usage of identical fully-qualified names of the participating class components. For example, out of a list of scanned JAR files including ala-0.0.1-SNAPSHOT.jar, ala-0.0.2-SNAPSHOT.jar, commons-io-2.2.jar, gson-2.8.0.jar, guava-20.0.jar, javassist-3.21.0-GA.jar, javax.servlet-api-3.0.1.jar, reflections-0.9.11.jar, spring-core-5.0.7.RELEASE.jar, and spring-jcl-5.0.7.RELEASE.jar, the application library analytics tool can determine that there are conflicts between the classes in the ala-0.0.1-SNAPSHOT.jar and ala-0.0.2-SNAPSHOT.jar files, such as org.jpmorgan.giam.utilities.TraverseCodeUtil, org.jpmorgan.giam.utilities. SaveResultUtil, org.jpmorgan.giam.utilities.ReportUtil, org.jpmorgan.giam.utilities.Properties, org.jpmorgan.giam.utilities.JarUtil, org.jpmorgan.giam.utilities.HtmlUtil, org.jpmorgan.giam.utilities.FileUtil, org.jpmorgan.giam.utilities.Constants, org.jpmorgan.giam.scanner.SourceCodeScan, org.jpmorgan.giam.scanner.Scan, org pmorgan.giam.scanner.ImportScan, org.jpmorgan.giam.scanner.DynamicScan, org.jpmorgan.giam.scanner.ArchiveScan, org.jpmorgan.giam.reports.UnusedJarsReport, org.jpmorgan.giam.reports.Summary, org.jpmorgan.giam.reports.Reports, org.jpmorgan.giam.reports.Dump, org.jpmorgan.giam.reports.ConflictingJarReports, org.jpmorgan.giam.jarimports.PropertyConfigurator, org.jpmorgan.giam.jarimports.ParserListener, org.jpmorgan.giam.jarimports.PackageFilter, org.jpmorgan.giam.jarimports.JavaPackage, org.jpmorgan.giamjarimports.JavaP, org.jpmorgan.giamjarimports.JavaClass, org.jpmorgan.giam.jarimports.JavaClass$ClassComparator, org.jpmorgan.giam.jarimports.Exp, org.jpmorgan.giam.jarimports.ClassFileParser, org.jpmorgan.giam.jarimports.ClassFileParser$FieldOrMethodInfo, org.jpmorgan.giam.jarimports.ClassFileParser$Constant, org.jpmorgan.giam.jarimports.ClassFileParser$AttributeInfo, org.jpmorgan.giam.jarimports.AbstractParser, org.jpmorgan.giam.ala.ArchiveAnalytics, org.jpmorgan.giam.ala.App.

Further, during a second portion of the scan, the application library analytics tool analyzes any references to the list of class from non-Java imports, e.g., JavaServer Pages (JSP) files, configuration files (e.g., Visual Studio project property (PROPS) file, Extensible Markup Language (XML) data file, etc.), as well as any runtime load references such as Class.forName(" . . . "), etc. According to an embodiment, as a result of the second portion of the scan, the application library analytics tool generates a list of unused JAR files 111. For example, out of the list of scanned JAR files including ala-0.0.1-SNAPSHOT.jar, ala-0.0.2-SNAPSHOT.jar, commons-io-2.2.jar, gson-2.8.0.jar, guava-20.0.jar, javassist-3.21.0-GA.jar, javax.servlet-api-3.0.1.jar, reflections-0.9.11.jar, spring-core-5.0.7.RELEASE.jar, and spring-jcl-5.0.7.RELEASE.jar, the application library analytics tool can determine that spring-core-5.0.7.RELEASE.jar and spring-jcl-5.0.7.RELEASE.jar are unused.

Figure 1C:
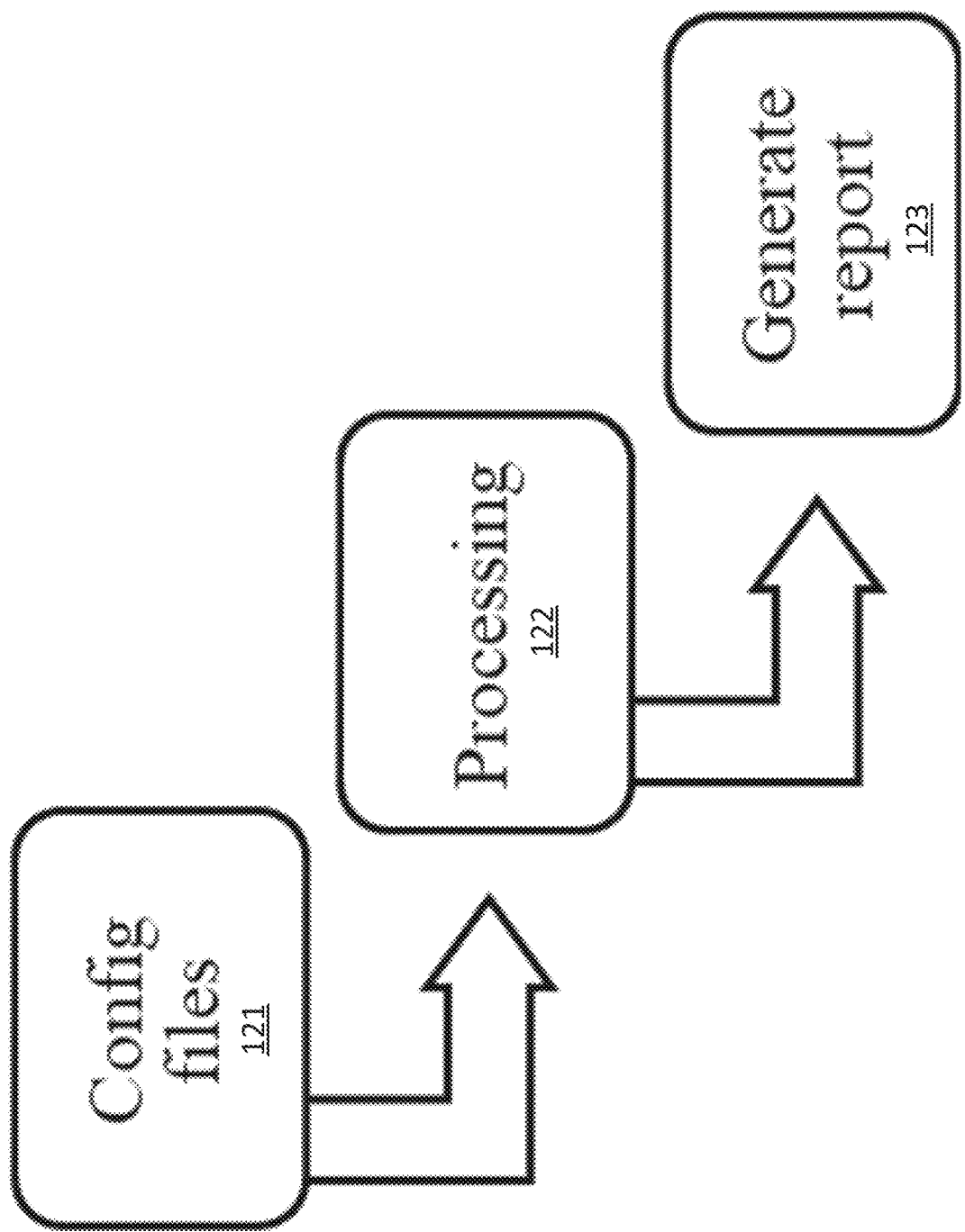
FIG. 1C illustrates the archive scan configuration according to an example embodiment of the present invention.

Then, as depicted in the figure, the process flow proceeds to step 120, e.g., a library-dependent archive scan. The archive scan configuration can include an archive path and an output path (e.g., for generating reports). FIG. 1C illustrates the archive scan configuration according to an example embodiment of the present invention. As depicted in the figure, the archive scan configuration includes configuration files 121, a processing step 122, and report generating step 123. According to an embodiment, the archive scan configuration can include two configurations, each configuration associated with a distinct parameter. The archive scan configuration can consider a web archive (e.g., WAR) and a JAR-Fat Java archive, which can contain other JARs.

Further, the configuration file 121 can include a JAR (e.g., single JAR responsible for running full application with no external dependencies) and the output path. During the processing step 122, the Java source code and a list of JARs are retrieved based on the provided JAR (e.g., using a first parameter from the configuration file 121). Further, the source code is parsed in order to gather class imports and to identify used Java classes. Further, the JAR files evaluated during the first step are also parsed in order to identify any JAR conflicts as well as determine the usefulness of the JARs. According to an embodiment, during the report generating step 123, a report is generated and placed in the output path (which is also provided in the configuration file 121). According to an embodiment, the report provides results of the class/JAR conflicts as well as usefulness of the JARs. According to an embodiment, as depicted in FIG. 1A, the archive scan is executed against the unused JAR files 111. In particular, during the archive scan, a list of .class files in the unused JAR files 111 is parsed in order to determine and identify any inter-dependencies across the different JAR files recursively. After all of the JAR to JAR dependencies are identified, any relevant and, therefore, "used" JAR files can be removed from the initial list of unused JAR files 111. According to an embodiment, the archive scan unzips all of the components bundled with the archives and analyzes the individual components to determine such usage and then generates a list of unused JAR files. According to an embodiment, a user/developer can remove JARs from a particular project as needed, e.g., if a JAR conflict is found. For example, as a result of the archive scan, the conflicted JAR file can be removed from the list of scanned JAR files. In other words, ala-0.0.1-SNAPSHOT.jar can be removed, thereby leaving ala-0.0.2-SNAPSHOT.jar, commons-io-2.2.jar, gson-2.8.0.jar, guava-20.0.jar, javassist-3.21.0-GA.jar, javax.servlet-api-3.0.1.jar, reflections-0.9.11.jar, spring-core-5.0.7.RELEASE.jar, and spring-jcl-5.0.7.RELEASE.jar in the list of scanned JAR files.

Then, after the archive scan, the process flow proceeds to step 130, e.g., a dynamic scan, which is performed during the application's runtime. The dynamic scan configuration can utilize the static scan configuration (i.e., source code path, an archive location, and an output path) or the archive scan configuration (i.e., archive path and an output path). According to an embodiment, the dynamic scan is executed against the resultant list of unused JAR files from the archive scan in order to identify any references to any of the JAR files in the resultant list while the application is running. As such, the dynamic scan can take into consideration any archives which are potentially loaded based on various configurations, e.g., database drivers which may get loaded based on particular database configurations, reflection application programming interface (API), etc. Then, if in step 140 it is determined that new archive classes are loaded, the dynamic scan can facilitate the removal (e.g., via the user/developer) of any JAR files from the resultant list that are referenced by the archive classes as depicted in step 150, resulting in a final potential unused libraries list 151. For example, the application library analytics tool can determine that a JAR file, e.g., spring-core-5.0.7.RELEASE.jar, is utilized during the use of the reflection API. In particular, spring-core-5.0.7.RELEASE.jar is implemented after the statement Class.forName ("org.springframework.util.FileCopyUtils") is called. As such, spring-core-5.0.7.RELEASE.jar can be removed from the list of unused JAR files, thereby only leaving spring-jcl-5.0.7 RELEASE jar.

Then, the potential library conflicts list 112 and the potential unused libraries list 151 may be provided for final output processing, as depicted in step 160. According to an embodiment, the final output may include (i) a list of all of the conflicting JAR files with their conflicting classes and (ii) a list of all of the potentially unused JAR files and their corresponding memory consumption for a server. Further, according to an embodiment, the final output may be presented via at least one of (i) an HTML dashboard, (ii) a PDF, and (iii) a CSV representation.

Figure 2:
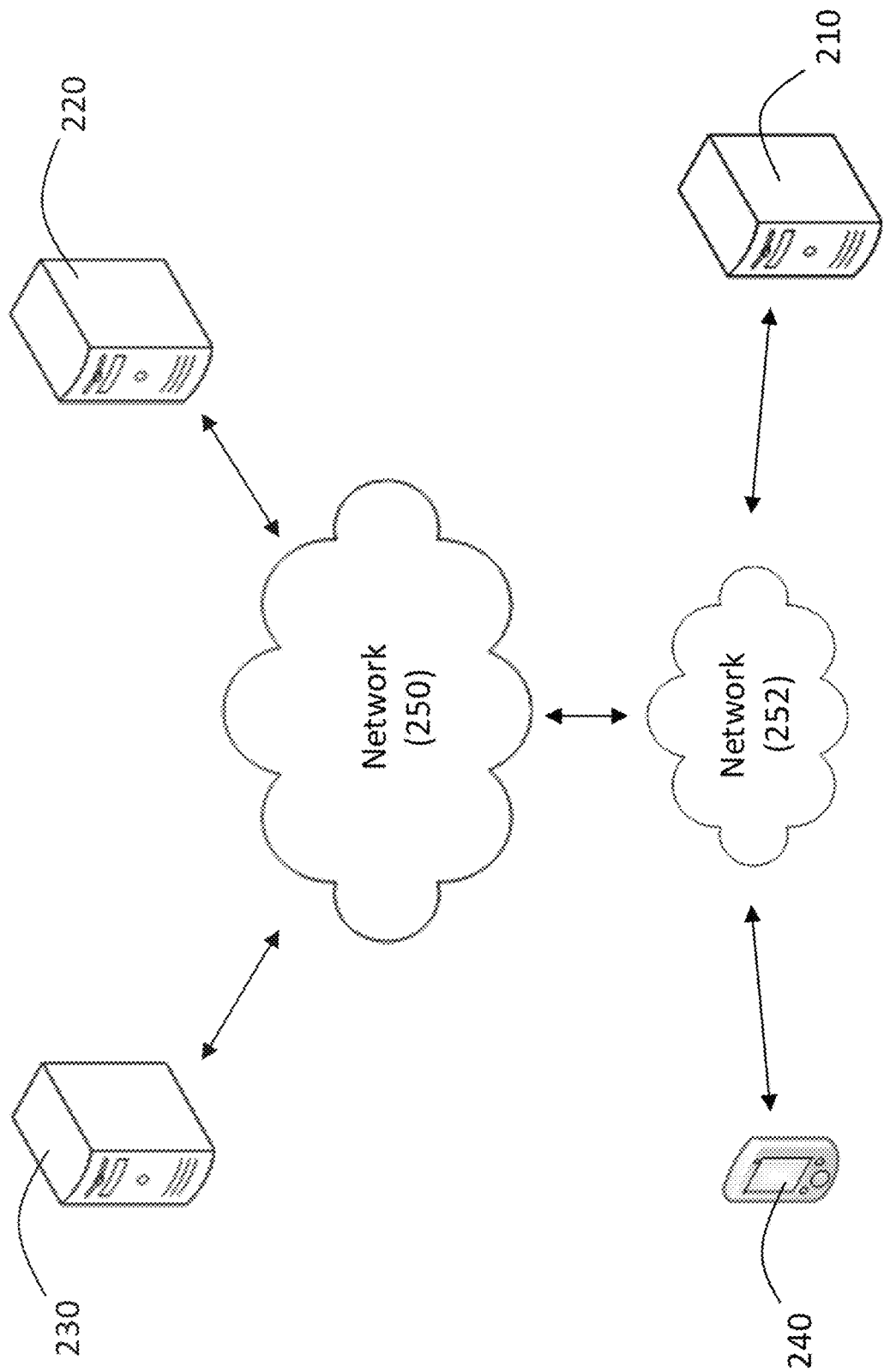
FIG. 2 illustrates a system implementing the application library analytics tool according to an exemplary embodiment of the present invention.

FIG. 2 illustrates a system implementing the application library analytics tool according to an exemplary embodiment of the present invention. As shown in FIG. 2, the system may include one or more computing devices, such as servers 210, 220, 230, and personal computing device 240. The system may also include one or more networks 250, 252 that connect the various computing devices shown in FIG. 2. Although only one personal computing device 440 and three servers 210, 220, 230 are shown in FIG. 2 to illustrate principles of the invention, in practice additional devices and servers may be involved in implementation of various embodiments of the invention. The networks may comprise, for example, any one or more of the Internet, an intranet, a Local Area Network (LAN), a Wide Area Network (WAN), an Ethernet connection, a WiFi network, a Global System for Mobile Communication (GSM) link, a cellular phone network, a Global Positioning System (GPS) link, a satellite communications network, or other network, for example.

The system implementing the application library analytics tool may be embodied primarily in a server 210, which executes the methods described above for identifying package files. The system may also include, or interface with, servers 220 and 230 that store and provide data that is input to the server 210. For example, the class imports scanned during the first portion of the static may be saved in at least one of the servers 220 and 230. The system may be accessed and controlled by a personal computing device 240 which may comprise a mobile phone, tablet computer, laptop computer, or desktop computer, for example. Further, the final output may be presented to a user via the personal computing device 240.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A computer-implemented method for identifying package files in an application, the method comprising:
    performing, with a processor, a static scan of application code, wherein the static scan (i) identifies a list of potential package file library conflicts and (ii) generates a first list of unused package files;
    performing, with the processor, a library dependent archive scan configured to include one or more configuration files, a processing step, and a report generating step, the library dependent archive scan executed against the first list of unused package files wherein, during the library dependent archive scan, (i) a list of .class files in the unused package files is parsed to determine any inter-dependencies across the unused package files, where unused package files with inter-dependencies are deemed relevant and therefore used, and (ii) a second list of unused package files is generated based on a removal of the relevant and therefore used package files from the first list;
    performing, with the processor, a dynamic scan on the second list, wherein, during the dynamic scan, (i) any references to any of the package files are identified in the second list while the application is running and (ii) a third list of unused package files is generated based on a removal of any of the package files with references from the second list; and
    displaying, with a display, (i) the list of potential package file library conflicts and (ii) the third list.

2. The method of claim 1, further comprising:
    scanning, with the processor, class imports in the application code;
    identifying, with the processor, all of the package files loaded by a virtual machine; and
    determining, with the processor, the list of potential package file library conflicts based on the scanned class imports and the identified package files loaded by the virtual machine.

3. The method of claim 1, further comprising:
    parsing, with the processor, .class files in the first list in order to determine and identify any inter-dependencies across the different package files recursively.

4. The method of claim 1, further comprising:
    determining, with the processor, whether new archive classes are being loaded, wherein the third list is generated based on a removal of any package files that are referenced by the new archive classes from the second list.

5. The method of claim 1, further comprising:
    presenting, with the processor, the list of potential package file library conflicts and the third list via at least one of (i) an HTML dashboard, (ii) a PDF, and (iii) a CSV representation.

6. The method of claim 1, wherein the first scan is comprised of a configuration including a source code path, an archive location, and an output path.

7. The method of claim 1, wherein the first scan is performed directly on source code or an archive file including the source code.

8. The method of claim 1, wherein the second scan is comprised of a configuration including an archive path and an output path.

9. The method of claim 1, wherein the package file is a Java Archive file.

10. A system for identifying package files in an application, the system comprising:
    a processor, wherein the processor is configured:
        perform a static scan of application code, wherein the static scan (i) identifies a list of potential package file library conflicts and (ii) generates a first list of unused package files;
        perform a library dependent archive scan configured to include one or more configuration files, a processing step, and a report generating step, the library dependent archive scan executed against the first list of unused package files, wherein during the library dependent archive scan, (i) a list of .class files in the unused package files is parsed to determine any inter-dependencies across the unused package files, where unused package files with inter-dependencies are deemed relevant and therefore used, and (ii) a second list of unused package files is generated based on a removal of the relevant and therefore used package files from the first list; and perform a dynamic scan on the second list, wherein during the dynamic scan, scan, (i) any references to any of the package files in the second list are identified while the application is running and (ii) a third list of unused package files is generated based on a removal of any of the package files with references from the second list; and a display, wherein the display displays (i) the list of potential package file library conflicts and (ii) the third list.

11. The system of claim 10, wherein, during the first scan, the list of potential package file library conflicts is determined based on scanned class imports in the application code and identified package files loaded by a virtual machine.

12. The system of claim 10, wherein, during the second scan, .class files in the first list are parsed in order to determine and identify any inter-dependencies across the different package files recursively.

13. The system of claim 10, wherein, during the third scan, (i) it is determined whether new archive classes are being loaded and (ii) the third list is generated based on a removal of any package files that are referenced by the new archive classes are selectively removed from the second list.

14. The system of claim 10, wherein the list of potential package file library conflicts and the third list is presented to a user via at least one of (i) an HTML dashboard, (ii) a PDF, and (iii) a CSV representation.

15. The system of claim 10, wherein the first scan is comprised of a configuration including a source code path, an archive location, and an output path.

16. The system of claim 10, wherein the first scan is performed directly on source code or an archive file including the source code.

17. The system of claim 10, wherein the second scan is comprised of a configuration including an archive path and an output path.

18. The system of claim 10, wherein the package file is a Java Archive file.

* * * * *

UNITED STATES PATENT AND TRADEMARK OFFICE
CERTIFICATE OF CORRECTION

PATENT NO. : 11,210,110 B2
APPLICATION NO. : 16/871430
DATED : December 28, 2021
INVENTOR(S) : Dilip Seshadri et al.

Page 1 of 1

It is certified that error appears in the above-identified patent and that said Letters Patent is hereby corrected as shown below:

In the Claims

In Claim 10, Column 11, Line 8, "during the dynamic scan, scan, (i) any references to" should read --during the dynamic scan, (i) any references to--.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*